(No Model.) 2 Sheets—Sheet 1.

J. A. TIGNER.
MANURE DISTRIBUTER.

No. 401,768. Patented Apr. 23, 1889.

Witnesses

Inventor,
James A. Tigner

By his Attorney (No Model.) 2 Sheets—Sheet 2.

J. A. TIGNER.
MANURE DISTRIBUTER.

No. 401,768. Patented Apr. 23, 1889.

Witnesses

Inventor
James A. Tigner.

By his Attorneys

UNITED STATES PATENT OFFICE.

JAMES ANDREW TIGNER, OF GORDON, LOUISIANA.

MANURE-DISTRIBUTER.

SPECIFICATION forming part of Letters Patent No. 401,768, dated April 23, 1889.

Application filed November 13, 1888. Serial No. 290,668. (No model.)

*To all whom it may concern:*

Be it known that I, JAMES ANDREW TIGNER, a citizen of the United States, residing at Gordon, in the parish of Claiborne and State of Louisiana, have invented a new and useful Improvement in Manure-Distributers, of which the following is a specification.

My invention relates to an improvement in manure-distributers; and it consists in the peculiar construction and combination of devices, that will be more fully set forth hereinafter, and particularly pointed out in the claim.

The object of my invention is to provide a manure-distributer which is adapted to be attached to and operated by an ordinary farm-wagon, and which is capable of distributing manure broadcast over the fields or in drills, and is also capable of seeding wheat and other cereals.

Figure 1:
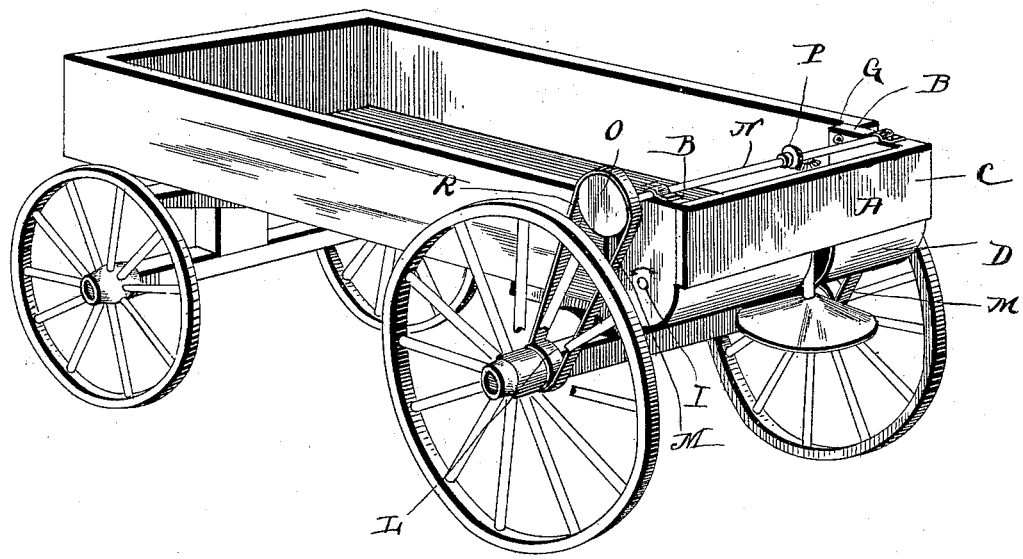
Figure 2:
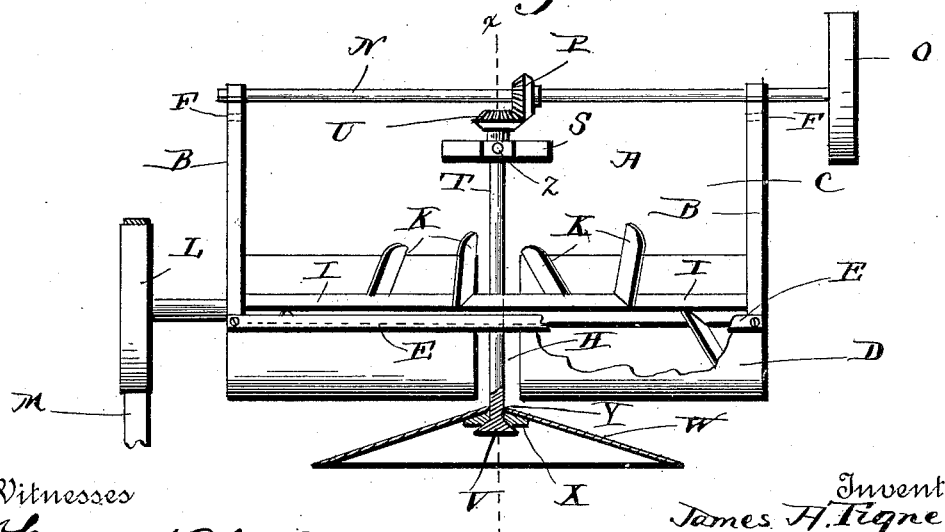
Figure 3:
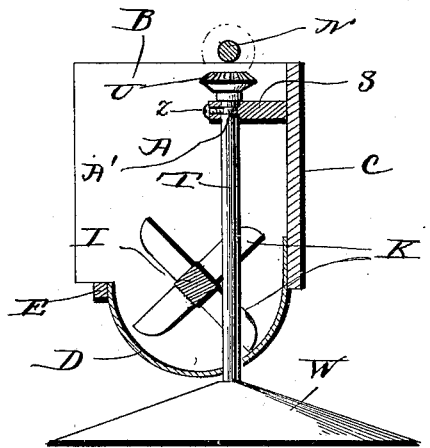
Figure 4:
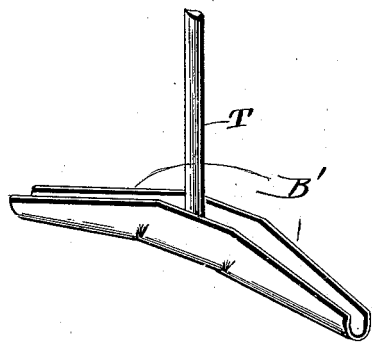
Figure 5:
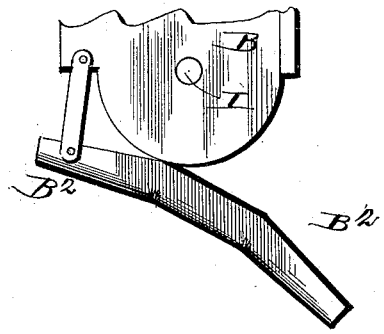

In the accompanying drawings, Figure 1 is a perspective view of a manure-distributing apparatus embodying my improvement, showing the same attached to a farm-wagon. Fig. 2 is a front elevation, partly in section, of my improved manure-distributing apparatus, showing the same detached from the wagon. Fig. 3 is a vertical sectional view of the same, taken on the line *x x* of Fig. 2. Figs. 4 and 5 are detail views of attachments to my manure-distributing apparatus.

A represents a rectangular receptacle or hopper, comprising the side walls, B, the rear walls, C, and the semi-cylindrical bottom D, the front edge of the same being secured to and supported by a cross-bar, E, the ends of which are secured in rabbets in the lower front corners of the sides B. The latter have near their upper front corners bolt-holes F, which are adapted to register with similar bolt-holes in the rear upper corners of a wagon-bed of the usual construction, and bolts G may be inserted in the said registering bolt-holes, and thereby caused to firmly secure the attachment to the rear end of the wagon-body, the end-gate of the latter being of course previously removed. The bottom of the hopper is provided with a central transverse opening, H.

I represents a shaft, which is journaled in bearings in the end walls, B, and is arranged concentrically with the semi-cylindrical bottom of the hopper and provided with a series of radial stirrers or feeders, K, which are arranged on spiral lines and are adapted to move the contents of the hopper to the discharge-opening in the center thereof, when the shaft is rotated in the direction indicated by the arrow in Fig. 1. Secured to one end of this shaft, which projects beyond one side of the hopper, is a pulley, L, which is connected to the hub, or to a pulley on one of the rear wagon-wheels, by means of an endless belt, M.

N represents a shaft, which is journaled in bearings on the upper ends of the end walls B, is provided at one end with a driving-pulley, O, and has near its center a miter gear-wheel, P. The pulley O is connected to the inner end of the hub of the remaining rear wheel of the wagon, or to a pulley secured to the said wheel, if preferred, by means of an endless belt, R.

From the foregoing description it will be understood that when the wagon is drawn forward the rotation of the rear wheels will be communicated to the shafts I and N.

S represents a bracket, which is secured to the end C in the center thereof, and in the said bracket is journaled the upper end of a vertical shaft, T. Said shaft extends downward through the openings in the bottom of the hopper, and is provided at its upper end with a pinion, U, that meshes with the pinion on gear R, whereby the rotation of the shaft N will be imparted to the shaft T. The lower end of said shaft T is provided with a T-shaped head, V.

W represents an inverted-funnel-shaped spreading cone, which has a central opening in its apex adapted to receive the shaft T, and has secured on its under side a block or nut, X, provided with a rectangular opening, Y, which receives the T-shaped head V, and thereby locks the spreading cone to the shaft T and causes it to rotate therewith. Said spreading cone may be removed from the shaft T by unscrewing the swiveled screw Z, that engages a threaded opening in the block S and enters an annular groove, A', near the upper end of shaft T, and by removing the gear U from the upper end of said shaft to permit the latter to be taken from the hopper.

The operation of my invention is as follows: The person stationed in the wagon supplies the hopper with manure, and the same is fed through the discharge-opening of the hopper onto the revolving cone by the shaft I and the spirally-arranged feed stirrers or blades K. The latter also serve to thoroughly disintegrate the manure and break it up in small particles. The manure as it passes onto the cone is spread broadcast upon the ground, as will be readily understood.

In Fig. 4 I illustrate an attachment for sowing seeds, the same comprising a pair of radial downwardly-inclined spouts, B', having their central portion adapted to be attached to the lower end of shaft T, as shown, in lieu of the spreading cone. When the attachment is thus equipped, seeds thrown into the hopper will be caused to drop broadcast on the ground by the whirling spouts B'.

By removing the spreading cone and the shaft T and attaching the depending spout $B^2$ to the bottom of the hopper in such manner that its upper end registers with the opening in the bottom of the hopper the manure may be fed to the ground in drills, this construction being shown in Fig. 5.

Having thus described my invention, I claim—

The manure-distributing attachment for wagons, comprising the hopper adapted to be attached to the rear end of the wagon-body and having the semi-cylindrical bottom provided with the discharge-opening, the shaft I, journaled in the walls of the hopper above the bottom thereof, and having the stirring-arms K and the pulley L at one end, the shaft N, journaled in the upper side of the hopper and having the pulley O, the vertical shaft T, journaled in bearings S in the hopper and extending down through the discharge-opening thereof, the mitered gears P U, connecting the shafts N T, the distributing device detachably secured to the lower end of shaft T, and the endless belts to connect the pulleys O L to the hubs of the rear wagon-wheels, substantially as described.

In testimony that I claim the foregoing as my own I have hereto affixed my signature in presence of two witnesses.

JAMES ANDREW TIGNER.

Witnesses:
   W. F. BRIDGES,
   J. R. FRAZIER.